United States Patent
Takahashi et al.

(10) Patent No.: US 7,069,493 B2
(45) Date of Patent: Jun. 27, 2006

(54) SEMICONDUCTOR MEMORY DEVICE EQUIPPED WITH ERROR CORRECTION CIRCUIT

(75) Inventors: Hiroshi Takahashi, Tsukuba (JP);
Akihiro Takegama, Tsukuba (JP);
Osamu Handa, Tokyo (JP); Hiroshi Kimizuka, Chiba (JP)

(73) Assignee: Texas Instruments Incorporated, Dallas, TX (US)

( * ) Notice: Subject to any disclaimer, the term of this patent is extended or adjusted under 35 U.S.C. 154(b) by 477 days.

(21) Appl. No.: 10/245,209

(22) Filed: Sep. 17, 2002

(65) Prior Publication Data

US 2003/0086306 A1 May 8, 2003

(30) Foreign Application Priority Data

Nov. 8, 2001 (JP) .............................. 2001-343316

(51) Int. Cl.
*G11C 29/00* (2006.01)
(52) U.S. Cl. ....................... 714/763; 714/710; 714/718
(58) Field of Classification Search ................ 714/733, 714/718, 781, 710, 766, 763; 365/201
See application file for complete search history.

(56) References Cited

U.S. PATENT DOCUMENTS

| | | | | |
|---|---|---|---|---|
| 4,726,021 A | * | 2/1988 | Horiguchi et al. .......... 714/773 |
| 4,939,694 A | * | 7/1990 | Eaton et al. ................. 365/200 |
| 5,265,054 A | * | 11/1993 | McClure ...................... 365/200 |
| 5,563,841 A | * | 10/1996 | Fujii et al. ............. 365/230.03 |
| 5,732,029 A | * | 3/1998 | Lee et al. .................... 365/200 |
| 5,761,128 A | * | 6/1998 | Watanabe .............. 365/189.01 |
| 6,157,584 A | * | 12/2000 | Holst .......................... 365/200 |
| 6,185,136 B1 | * | 2/2001 | Shirley ....................... 365/200 |
| 6,505,313 B1 | * | 1/2003 | Phan et al. .................. 714/718 |

* cited by examiner

*Primary Examiner*—Albert DeCady
*Assistant Examiner*—Mujtaba K. Chaudry
(74) *Attorney, Agent, or Firm*—Wade James Brady, III; Frederick J. Telecky, Jr.

(57) ABSTRACT

The objective of the invention is to provide a type of semiconductor memory device equipped with an error correction circuit 200 characterized by the fact that it can perform correction of errors in stored data without increasing the circuit size and power consumption, and without decreasing operating speed. An error correction code EC corresponds to data stored in sub-memory 120 separate from main data stored in main memory 110. In read mode, the main data and error correction code are read from the main memory and sub-memory, respectively. On the basis of these data, the error correction code is generated for correcting errors in the read data. Error correction circuit 300 corrects errors in the main data. By storing the error correction code in a sub-memory different from the main memory and selecting the appropriate layout of the main memory and sub-memory, it is possible to increase the reading speed of the error correction code and to suppress time delays caused by error correction.

12 Claims, 9 Drawing Sheets

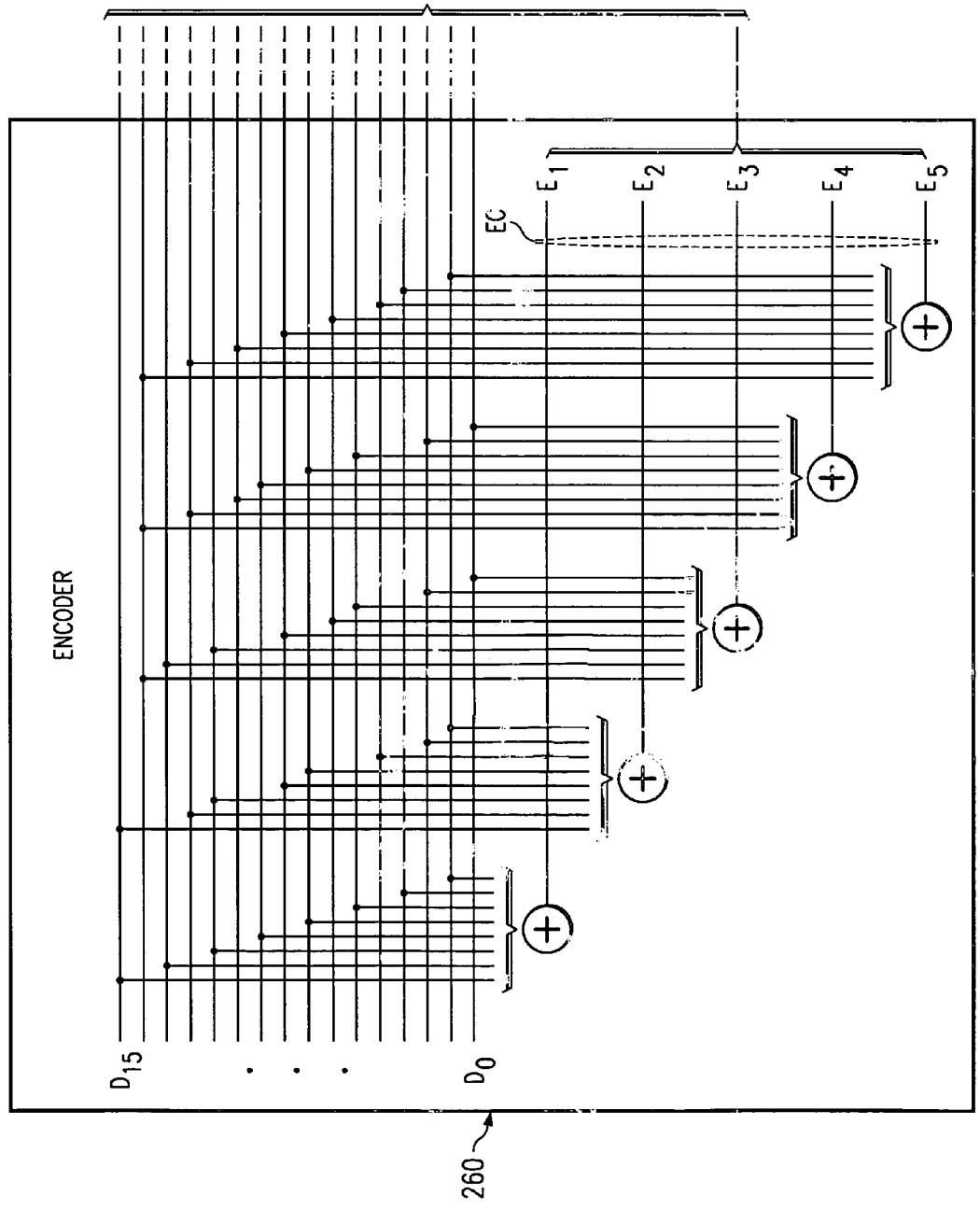

SEMICONDUCTOR MEMORY DEVICE EQUIPPED WITH ERROR CORRECTION CIRCUIT

FIELD OF THE INVENTION

The present invention pertains to a type of semiconductor memory device equipped with an error correction circuit that corrects errors in the stored data.

BACKGROUND OF THE INVENTION

In recent years, there has been a trend in rapid development of smaller SRAMs and scaling down of the power source voltage. As a result, data errors (Soft Error Rate, referred to as SER hereinafter) in semiconductor memory devices such as SRAMs tend to increase. For example, the widely used 6-transistor SRAM has no particular provisions for ensuring a capacitance of 50 fF or more as with the capacitors of conventional DRAMs. Specifically, for SRAM designed to perform logical processes, SERs are more pronounced than in general-purpose DRAMs. If such scaling continues, it is believed that the SER problem will become more important, and will be a major problem in the scaling of SRAMs.

This danger grows due to the increase in the on-chip memory capacitance in DSPs. For example, when it is used as data memory, the error operation due to a data error of 1 bit is not a major problem. However, when it is used as program memory, even a data error of 1 bit may lead to control failures of DSPs.

In the prior art, to counteract SERs in general-purpose DRAMs, the technology for error checking and correction (hereinafter referred to as FCC) is adopted. However, in general-purpose DRAMs, the operation performed on the system level is preferred over that by means of on-chip ECC with respect to cost, reliability and performance. Now, with progress in the semiconductor manufacturing technology, the semiconductor devices become smaller and the power source voltage becomes lower. For cDSP that carries DSP, ARM, etc. that form the system on-chip, the necessity for solving this problem at the chip level becomes more and more important.

Examples of typical ECC algorithms include Hamming code system, vertical-horizontal parity system, etc. In the conventional DRAM, the following system is usually adopted: in the latter stage of the input circuit used for writing, the ECC circuit is set to generate ECC code, which, together with the data code, is stored in a prescribed memory region. During a read operation, the ECC code is read together with the data code, and by means of an ECC circuit set on the output side of a sense amplifier, the error of the data code is detected and corrected on the basis of the data code and ECC code.

However, the aforementioned conventional error correction system that uses the ECC circuit has some disadvantages. Since an ECC circuit is connected in series downstage to the read circuit, the data read speed is reduced. In addition, use of the ECC circuit leads to an increase in the circuit size and increase in the power consumption.

Several methods for decreasing the SER without using an ECC circuit have been proposed, such as a method in which the storage capacity of the memory node of the SRAM is increased so as to prevent damage to the stored data, a method in which voltage of the storage node of the SRAM is raised, etc. However, these methods also have disadvantages. When the capacity of the storage node is increased, it is necessary to introduce a DRAM or a special process, and the cost increases. Also, the circuit size inevitably becomes larger. When the voltage at the storage node is raised, reduction in feature size of the SRAM is limited, SRAM performance diminishes, and power consumption and costs increase.

In addition, there is another method in which the SRAM is formed on an insulated substrate instead of a silicon substrate, that is, the so-called SOI (Semiconductor On Insulator). However, this method is not very effective in improving the SER. Also, a method for improving the data reliability by introducing ferroelectric memory (FeRAM) has been proposed. However, mass production technology has not been developed for this method.

The objective of the present invention is to solve the aforementioned problems of the conventional methods by providing a type of semiconductor memory device that has an error correction circuit which can correct errors in the stored data without increasing the circuit size and power consumption or decreasing the operating speed.

SUMMARY OF INVENTION

In order to realize the aforementioned objective, the semiconductor memory device equipped with an error correction circuit of the present invention has a main memory that contains the main data, a sub-memory that contains error correction sub-data generated corresponding to the main data, a sense amplifier for reading the main data stored in the main memory, a decoder circuit that generates correction data for correcting the errors generated in the main data on the basis of the main data read from the main memory and the sub-data read from the sub-memory, and a data correction circuit that corrects the error contained in the main data read from the main memory corresponding to the correction data. Also, as a preferred feature of the present invention, the sub-memory is arranged between the main memory and the decoder circuit and between main memory and the data correction circuit. Also, as a preferred feature of the present invention, the bit lines of the main memory and the bit lines of the sub-memory are formed in different wiring layers. Also, according to the present invention, the data correction circuit preferably has plural bit correction circuits corresponding to the number of bits in the main data; each the bit correction circuit has a first transistor that is connected between a first power source potential and the output node, with its control terminal connected to the first node, a second transistor that is connected between a second power source potential and the output node, with its control terminal connected to the second node, a transfer gate electrically connected between the first node and the second node corresponding to an enable signal, and a driving means that drives the first node and the second node to a potential corresponding to the bit information of the main data according to the bit information of the correction data. Also, as a preferred feature of the present invention, the correction data is a vertical-horizontal parity code or Hamming code generated corresponding to the main data.

REFERENCE NUMERALS AND SYMBOLS AS SHOWN IN THE DRAWINGS

In the figures, 100 represents a memory unit, 110 a main memory array, 120 a sub-memory array, 130 a sense amplifier, 140 a driver, 150 a driver, 160-1, 160-2, 160-3 a transfer gate, 170 a transfer gate, 200 an error correction unit, 210 a flip-flop circuit, 220 a latch circuit, 230 a selector, 250 an ECC decoder, 260 an ECC encoder, 270 a selector, 280-1, 280-2, 280-3 a buffer, 300 an error correction circuit, $V_{cc}$ a power source voltage, and GND ground potential.

DESCRIPTION OF THE EMBODIMENTS

Figure 1:
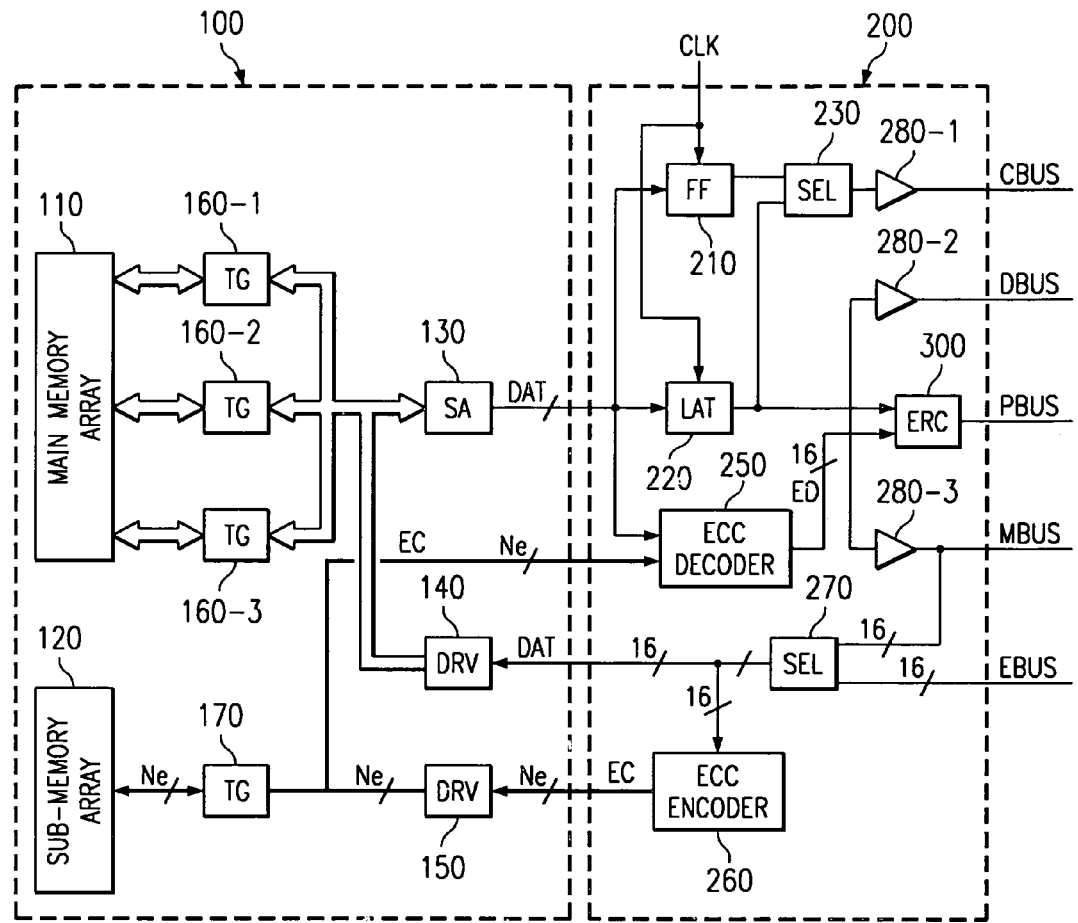
FIG. 1 is a circuit diagram illustrating an embodiment of the semiconductor memory device equipped with the error correction circuit of the present invention.

FIG. 1 is a circuit diagram illustrating an embodiment of the semiconductor memory device equipped with the error correction circuit of the present invention. As shown in this figure, the semiconductor memory device in this embodiment is composed of memory unit 100 and error correction unit 200. Memory unit 100 consists of main memory array 110, sub-memory array 120, sense amplifier (SA) 130, drivers 140, 150, and transfer gates (TG) 160-1, 160-2, 160-3 and 170. Also, error correction unit 200 consists of flip-flop circuit (FF) 210, latch circuit 220, selector (SEL) 230, ECC decoder 250, ECC encoder 260, selector 270, buffers 280-1, 280-2 and 280-3, and error correction circuit (ERC) 300.

First, let's look at the structure of the various portions of memory unit 100. Main memory array 110 stores data, and sub-memory array 120 stores error correction data. The stored data input from the outside is input through driver 140, and it is stored in main memory 110 through transfer gates 160-1, 160-2, 160-3. The data stored in main memory array 110 is in units of 16 bits. That is, the data bus is 16 bits wide between driver 140 and input selector 270 and between sense amplifier 130 on the one hand, and flip-flop circuit 210, latch circuit 220 and ECC decoder 250 on the other. Also, bit line pairs made up of bit lines and complementary bit lines are connected between driver 140 on the one hand, and transfer gates 160-1, 160-2, 106-3 on the other and between each transfer gate and sense amplifier 130. For example, there are 16 groups of the bit line pairs.

Error correction code EC generated by ECC encoder 260 is input through driver 150. Then, it is stored in sub-memory array 120 through transfer gate 170. As shown in the figure, the error correction data stored in sub-memory array 120 is made up of $n_e$ bits. That is, the data bus between driver 150 and transfer gate 170, between transfer gate 170 and ECC decoder 250, and between ECC encoder 260 and driver 150 is $n_e$ bits wide. Also, $n_e$ depends on the method of error checking and error correcting. For example, when a vertical-horizontal parity code is used, $n_e$ is 8 bits; when Hamming code is used, $n_e$ is 5 bits.

Sense amplifier 130 amplifies the potential difference of a bit line pair composed of a bit line and a complementary bit line in read mode. Corresponding to the result of the amplification, the read data is determined and output to flip-flop circuit 210, latch circuit 220 and ECC decoder 250. Also, sense amplifier 130 is a sense amplifier for use in the conventional SRAM. Since it is well known in the prior art, it will not be explained in detail here.

Driver 140 drives a potential difference of the bit line pair composed of the bit line and the complementary bit line, in response to the input data from selector 270. The input data is stored in main memory array 110 through a transfer gate.

During data write and read operations, transfer gates 160-1, 160-2, 106-3 are switched on/off corresponding to the write enable signal or read enable signal. Here, plural transfer gates are used to select corresponding memory blocks when the main memory array 110 is composed of plural blocks.

Corresponding to error correction code EC generated by ECC encoder 260, driver 150 drives the bit line pair composed of bit lines and complementary bit lines, and error correction code EC is stored in sub-memory array 120 through transfer gate 170.

In write or read mode, transfer gate 170 is kept on corresponding to the write enable signal or read enable signal. In write mode, error correction code EC input from driver 150 is input to sub-memory array 120. In read mode, error correction data read from sub-memory array 120 is output to ECC decoder 250.

As explained above, in read mode, error correction code EC is directly output to ECC decoder 250 without going through the sense amplifier. As a result, the signal delay caused by the sense amplifier can be eliminated, and the read operation can be performed at higher speed. In the semiconductor memory device of this embodiment, by selecting the appropriate configuration of the memory peripheral circuit, such as main memory array 110, sub-memory array 120, sense amplifier, etc., error correction code EC can be input directly to ECC decoder 250 without going through the sense amplifier. As a result, delays due to reading of the error correction data are suppressed, delays due to error correction can be reduced, and the memory access speed can be increased. The layout of the semiconductor memory device in this embodiment will be explained in more detail below.

In the following, let's look at the structures of various portions of error correction unit 200. Flip-flop circuit 210 holds the output data of sense amplifier 130, and outputs it to selector 230. Flip-flop circuit 210 is composed of a master latch and a slave latch with operation timing controlled by clock signal CLK. Consequently, for flip-flop circuit 210, when clock signal CLK is input, the data held in the master latch is shifted to the slave latch, and the new input data is held with the master latch. The data held in the slave latch is output as the output data of the flip-flop circuit to selector 230 of the latter stage.

Latch circuit 220 holds the input data and outputs it to selector 230 and error correction circuit 300. Latch circuit 220 operates at the input timing of clock signal CLK, and holds the input data. As explained above, when clock signal CLK is input, for example, latch circuit 220 holds and outputs the input data at the rising edge or falling edge of the clock signal CLK. Flip-flop circuit 210 holds and outputs the input data one half cycle of clock signal CLK later. That is, the output data of flip-flop circuit 210 is later than the output data of latch circuit 220 by one half clock signal CLK period.

Selector 230 selects data from the output of flip-flop circuit 210 or the output of latch circuit 220, and outputs the selected data to buffer 280-1. When the output of latch circuit 220 is selected with selector 230, the read data from the sense amplifier is selected synchronously with clock signal CLK, and outputs it to buffer 280-1. When the output of flip-flop circuit 210 is selected with selector 230, the read data of the sense amplifier is delayed for one half period of clock signal CLK, and it is output to buffer 280-1. The selected data of selector 230 is output through buffer 280-1 to data bus CBUS. That is, under the control of selector 230, the data output to data bus CBUS can be delayed by one half cycle of clock signal CLK. As a result, for example, it is possible to meet the demand of the output timing of data bus CBUS. Latch circuit 220 also produces data at to buffers 280-2, 280-3 and error correction circuit 300. Buffer 280-2 outputs the data input to data bus DBUS, and buffer 280-3 outputs the data input to data bus MBUS.

In response to error correction data ED output from ECC decoder 250, error correction circuit 300 performs error correction for the read data of the sense amplifier output from latch circuit 220, and outputs the corrected data to program bus PBUS. Corresponding to read data DAT from main memory array 110 and error correction code EC from sub-memory array 120, ECC decoder 250 generates error correction data ED, and sends it to error correction circuit 300.

The structures of ECC decoder 250, ECC encoder 260 and error correction circuit 300 depend on the error correction algorithm. Their specific examples will be presented later in detailed description.

Figure 2:
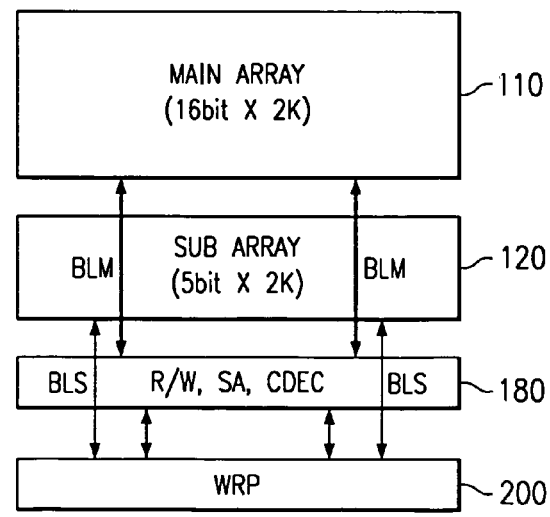
FIG. 2 is a diagram illustrating the layout of the semiconductor memory device.

In the following, let's look at the layout of the semiconductor memory device in this embodiment with reference to FIG. 2. FIG. 2 is a diagram illustrating the layout of the memory array in this embodiment, as well as the various portions of its peripheral circuit and the error correction circuit. As can be seen from the figure, on a semiconductor substrate, the following portions are sequentially arranged: memory array (Main Array) 110, sub-memory array (Sub Array) 120, a circuit composed of read/write (R/W) output, sense amplifier (SA), and column decoder (CDEC) (hereinafter referred to as peripheral circuit 180 for convenience), and error correction unit 200.

Also, as shown in FIG. 2, bit lines BLM connected to the memory cells of main memory array 110 and bit lines BLS connected to the memory cells of sub-memory array 120 form different wiring layers. For example, bit lines BLM of main memory array 110 are formed in metal wiring layer MTn, while bit lines BLS of sub-memory array 120 are formed in wiring layer MTm (m<n) below the metal wiring layer MTn. Also, as shown in FIG. 2, sub-memory array 120 is arranged nearer to peripheral circuit 180 than main memory array 110.

By means of the aforementioned wiring structure and layout, bit lines BLS connected to the memory cells of sub-memory array 120 are formed shorter than bit lines BLM connected to the memory cells of main memory array 110. That is, the data read from single bond cells can be sent to error correction unit 200 through bit lines BLS with a lower load. The data read from memory cells of main memory array 110 are sent to the sense amplifier of peripheral circuit 180 through longer bit lines BLM. Consequently, the data read from sub-memory array 120 can be transferred directly to error correction unit 200 without going through the sense amplifier. The data read from main memory array 110 is first amplified with a sense amplifier, and it is then sent to error correction unit 200.

In this way, the data read from sub-memory array 120 can reach error correction unit 200 sooner. As a result, a portion of the delay time generated due to ECC decoder 250 is absorbed, an increase in the delay time due to the error correction processing can be suppressed, and the memory access speed can be increased.

Figure 3:
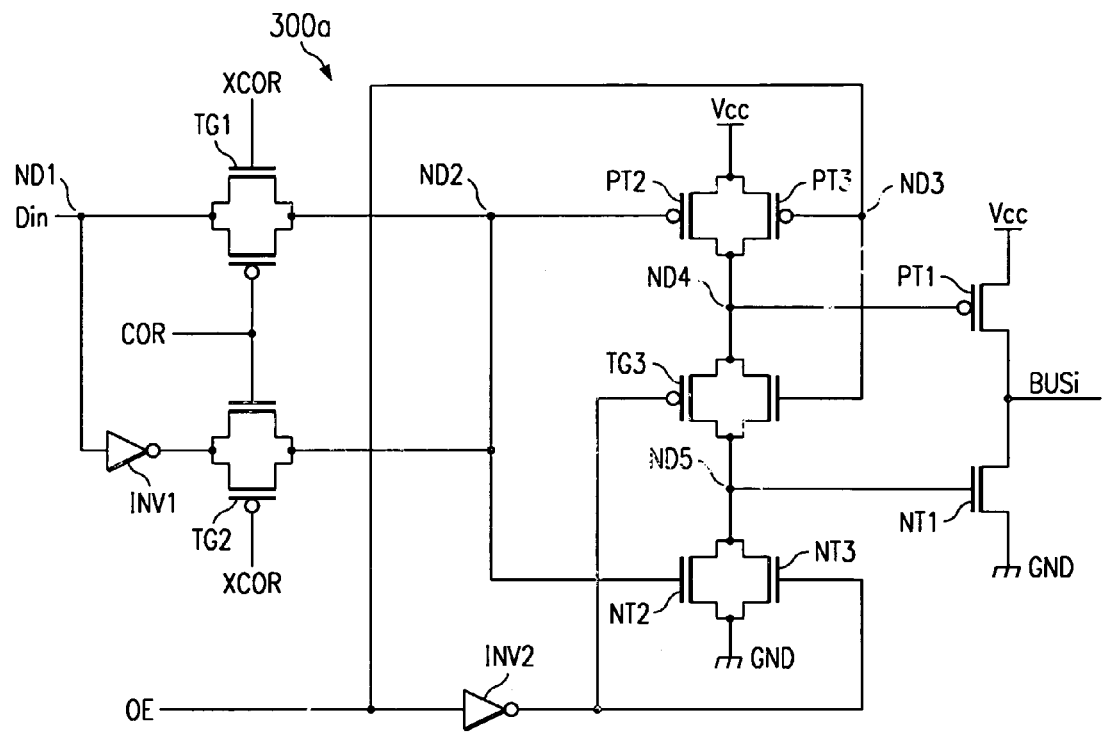
FIG. 3 is a circuit diagram illustrating an example of constitution of the error correction circuit.

In the following, let's look at the structure of error correction circuit 300 set in error correction unit 200 shown in FIG. 1. FIG. 3 is a circuit diagram illustrating the bit correction circuit as a structural unit of error correction circuits 300. Bit correction circuits 300a shown in FIG. 3 are set in a number equal to the number of bits of the corrected read data. For example, when 16-bit data is read in each cycle from main memory array 110, sixteen bit correction circuits 300a shown in FIG. 3 are required. By means of these error correction circuits, the various bits of the read data are corrected corresponding to error correction data ED output from ECC decoder 250, and the corrected data are output to program bus PBUS.

As shown in FIG. 3, each bit correction circuit 300a is composed of transfer gates TG1, TG2 and TG3, inverters INV1, INV2, pMOS transistors PT1, PT2 and PT3, and nMOS transistors NT1, NT2 and NT3. The input terminal of transfer gate TG1 is connected to input node ND1 of read data $D_{in}$, and its output terminal is connected to node ND2. The input terminal of transfer gate TG2 is connected to the output terminal of inverter INV1, and its output terminal is connected to node ND2. The input terminal of inverter INV1 is connected to input node ND1 of read data $D_{in}$.

Complementary correction signal XCOR is the inverse of signal ED (FIG. 1). Correction signal COR is the inverse of complementary correction signal XCOR and, therefore, logically equivalent to signal ED. Complementary correction signal XCOR is input to the gate of nMOS transistor that forms transfer gate TG1. Correction signal COR is input to the gate of pMOS transistor of transfer gate TG1. Complementary correction signal XCOR is input to the gate of pMOS transistor that forms transfer gate TG2, and correction signal COR is input to the gate of nMOS transistor.

Correction signal COR corresponds to a bit in error correction data ED output from ECC decoder 250. When there is no error in read data $D_{in}$, correction signal COR corresponding to the data $D_{in}$ is held at the low level. On the other hand, when an error is detected in read data $D_{in}$, correction signal COR is held at the high level. Consequently, if there is no error in data $D_{in}$, transfer gate TG1 is on, and transfer gate TG2 is off. Consequently, data $D_{in}$ n goes through transfer gate TG1 and is input to node ND2. On the other hand, if there is an error in data $D_{in}$, transfer gate TG1 is off, and transfer gate TG2 is on. Consequently, the output of inverter INV1, that is, the logical NOT data of read data $D_{in}$ is input to node ND2 through transfer gate TG2.

Transistors PT2 and PT3 are connected in parallel between power source voltage $V_{cc}$ and node ND4. Transfer gate TG3 is connected between node ND4 and node ND5. In addition, transistors NT2 and NT3 are connected in parallel between node ND5 and ground potential GND. The gate of transistor PT2 is connected to node ND2, and the gate of transistor PT3 is connected to the input terminal of enable signal OE. The gate of transistor NT2 is connected to node ND2, and the gate of transistor NT3 is connected to the output terminal of inverter INV2. The gate of the nMOS transistor that forms transfer gate TG3 is connected to the input terminal of enable signal OE, and the gate of the pMOS transistor is connected to the output terminal of inverter INV2. That is, the inverted signal of enable signal OE is applied to the gate of pMOS transistor that forms transfer gate TG3.

In operation, inverter INV1 and transfer gates TG1 and TG2 produce an exclusive-OR function of data signal Din and correction signal COR at output node ND2. The remaining circuitry of FIG. 3 produces a tristate output of the signal at node ND2 at output bus PBUSi. Output bus PBUSi is the $i^{th}$ bit of bus PBUS (FIG. 1). When enable signal OE is at the low level, transfer gate TG3 is off and transistors PT3 and NT3 are on. Thus, nodes ND4 and ND5 are held at high and low levels, respectively. These high and low levels are applied to the respective control gates of transistors PT1 and NT1, thereby turning them off. In this condition, the correction circuit of FIG. 3 produces a high impedance output at bus PBUSi.

Alternatively, when enable signal OE is at the high level, transfer gate TG3 is on, and node ND4 and node ND5 are held at the same potential. In this case, transistors PT1 and NT1 form an inverter that drives program bus PBUSi. Because one of transistors PT1 and NT1 is on while the other is off corresponding to the potential of nodes ND4 and ND5, program bus PBUSi is driven to the high level or low level.

Because transistors PT1 and NT1 drive a data bus with a large load, they must produce a low impedance high and low levels. The circuit of FIG. 3 advantageously connects output bus PBUSi to Vcc or GND through a single transistor PT1 or NT1, respectively. Thus, the circuit is capable of driving large loads. Furthermore, since the bus is shared, the circuit of FIG. 3 must selectively produce a high impedance output when other signals are driven on the bus. The circuit of FIG. 3, therefore, advantageously produces a tristate output capable of driving large loads and capable of producing a high impedance output.

Bit correction circuit 300a performs error correction on read data $D_{in}$ corresponding to correction signal COR sent from FCC decoder 250 as well as its inverted signal XCOR. For example, when correction signal COR at the high level is received from FCC decoder 250, transistor TG1 is off, and transfer gate TG2 is on. Therefore, the logical NOT data of read data $D_{in}$ is input to node ND2 through transfer gate TG2. On the other hand, when correction signal COR at the low level is received from FCC decoder 250, transfer gate TG1 is on, and transfer gate TG2 is off. Consequently, read data $D_{in}$ is input to node ND2 through transfer gate TG1.

Figure 4:
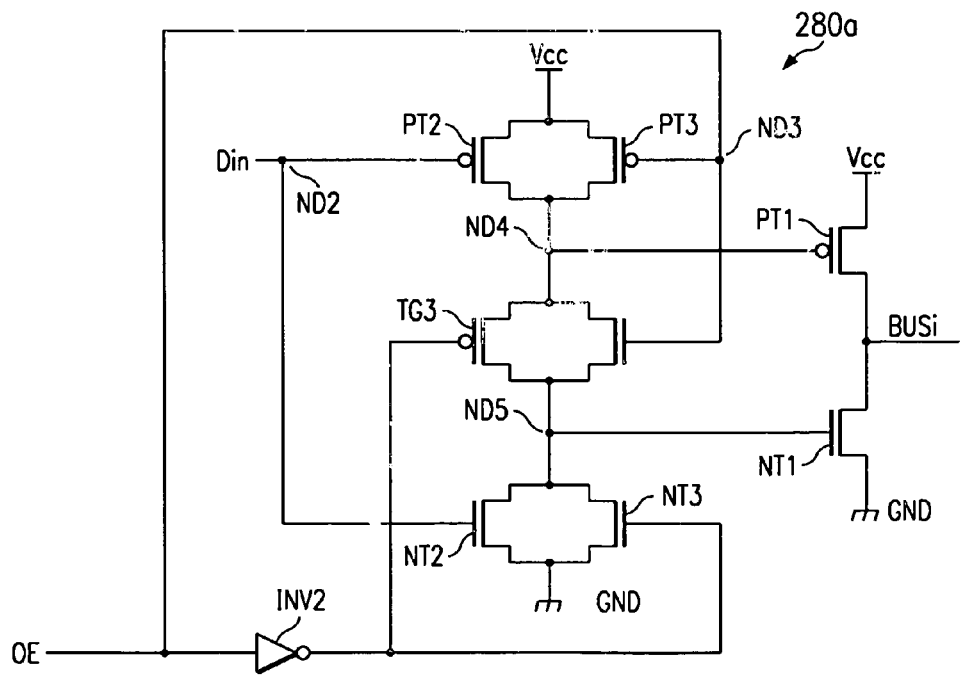
FIG. 4 is a circuit diagram illustrating an example of the constitution of the buffer.

FIG. 4 is a circuit diagram illustrating the constitution of buffer 280a that drives the data bus other than program bus PBUS and may be used in buffers 280-1, 280-2, and 280-3. As shown in the figure, buffer 280a is free of transfer gates TG1, TG2 and inverter INV1 as compared with bit correction circuit 300a shown in FIG. 3. That is, buffer 280a is composed of transfer gate TG3, inverter INV2, pMOS transistors PT1, PT2 and PT3, and NMOS transistors NT1, NT2 and NT3.

Transistors PT2 and PT3 are connected in parallel between power source voltage $V_{cc}$ and node ND4. Transfer gate TG3 is connected between nodes ND4 and ND5. Also, nMOS transistors NT2 and NT3 are connected in parallel between node ND5 and ground potential GND. The gate of transistor PT2 is connected to node ND2, and the gate of transistor PT3 is connected to the input terminal of enable signal OE. The gate of transistor NT2 is connected to node ND2, and the gate of transistor NT3 is connected to the output terminal of inverter INV2. The gate of nMOS transistor that forms transfer gate TG3 is connected to the input terminal of enable signal OE, and the gate of pMOS is connected to the output terminal of inverter INV2. That is, the inverted signal of enable signal OE is applied to the gate of the pMOS transistor that forms transfer gate TG3. Transistors PT1 and NT1 are connected in series between power source voltage $V_{cc}$ and ground potential GND. The gate of transistor PT1 is connected to node ND4, and the gate of transistor NT1 is connected to node ND5. That is, transistors PT1 and NT1 form an inverter for driving data bus BUSi.

In the standby state, enable signal OE is at the low level. In this case, transfer gate TG3 is off. Also, pMOS transistor PT3 and nMOS transistor NT3 are on. Therefore, node ND4 is held at the high level, and node ND5 is held at the low level. Consequently, both transistors PT1 and NT1 are kept in the off state, thereby producing a high impedance output at bus BUSi.

During operation, enable signal OE is at the high level. In this case, since transfer gate TG3 is on, nodes ND4 and ND5 are at the same potential. In response to read data $D_{in}$ input to node ND2, the potential of nodes ND4 and ND5 is the logical inverse of node ND2. In addition, corresponding to the potential of nodes ND4 and ND5, one of transistors PT1 and NT1 is kept on, while the other is kept off. For example, when nodes ND4 and ND5 are at the high level, transistor PT1 is off and transistor NT1 is on. Consequently, data bus BUSi is driven at the low level. On the other hand, because nodes ND4 and ND5 are at the low level, transistor PT1 is on and transistor NT1 is off. Consequently, data bus BUSi is driven to the high level. By means of the buffer 280a, data bus BUSi can be driven to the prescribed potential corresponding to read data $D_{in}$. Also, in the standby state, transfer gate TG3 is off, and both drive transistors PT1 and NT1 are controlled to be off. Consequently, in the standby state, the buffer 280a produces a high impedance output at bus BUSi.

In the following, let's look at the constitution of ECC encoder 260 and ECC decoder 250. ECC encoder 260 and ECC decoder 250 work according to the ECC algorithm. The data stored in main memory 110 corresponds to the data stored in sub-memory 120. ECC encoder 260 generates error correction code EC and stores it in sub-memory 120. In the read mode, on the basis of data DAT read from main memory 110 and the error correction code EC read from sub-memory 120, error correction code ED is generated by ECC decoder 250. Each bit of this 16-bit error correction code ED is applied to each respective bit correction circuit 300a together with each of the bits of the read data. Data with errors are corrected, and the corrected data is output to program bus PBUS as will be explained in detail.

Figure 5:
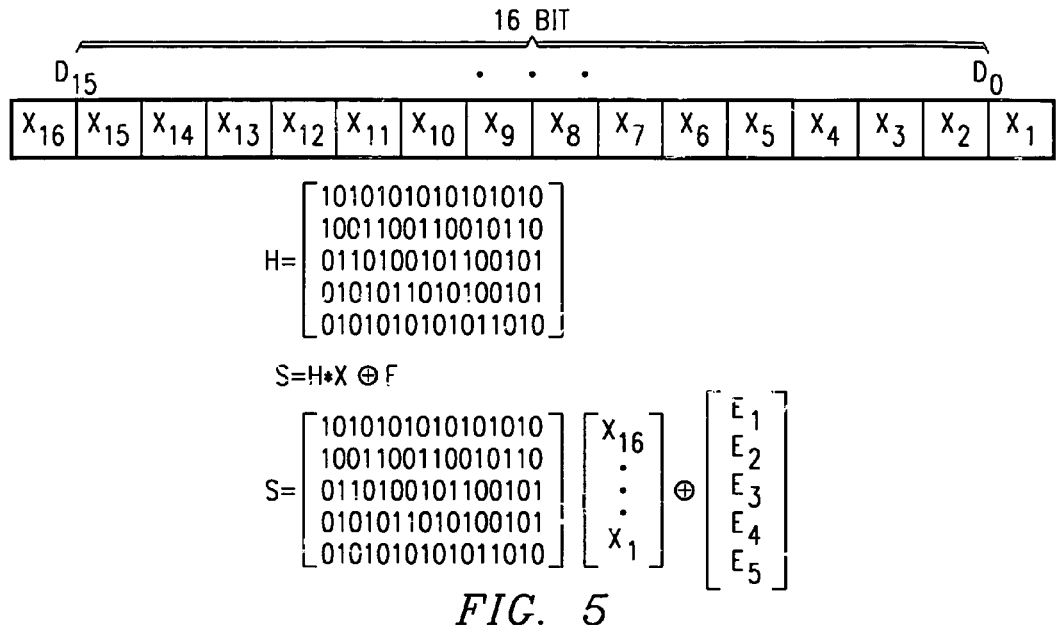
FIG. 5 is a schematic diagram illustrating the principle of the Hamming system.

The structures of ECC encoder 260 and ECC decoder 250 depend on the ECC algorithm adopted for error correction. In the following, let's look at the structures of the ECC encoder and decoder corresponding to the ECC algorithm for the conventionally used vertical-horizontal parity system and Hamming system. FIG. 5 is a diagram illustrating the principle of the Hamming code. As shown in this figure, a 5-bit ECC code EC is generated using 16-bit input data and 16×5 ECC code generating matrix H. The 16-bit input data is stored in main memory array 110, and the 5-bit error correction code EC is stored in sub-memory array 120.

In write mode, a 5-bit error correction code EC ($E_1$–$E_5$) is generated by ECC encoder 260 (FIG. 1) from a 16-bit input data word DAT ($X_1$–$X_{16}$). The 5-bit error correction code EC is stored in sub-memory 120, and the 16-bit input data word DAT is stored in main memory 110.

In read mode, according to 16-bit read data DAT from main memory array 110 and 5-bit error correction code EC from sub-memory array 120, error correction data ED is generated for correcting the error generated in each bit of read data DAT. Then, by means of error correction circuit 300, the error bit generated in the read data is corrected corresponding to error correction data ED.

Figure 6B:
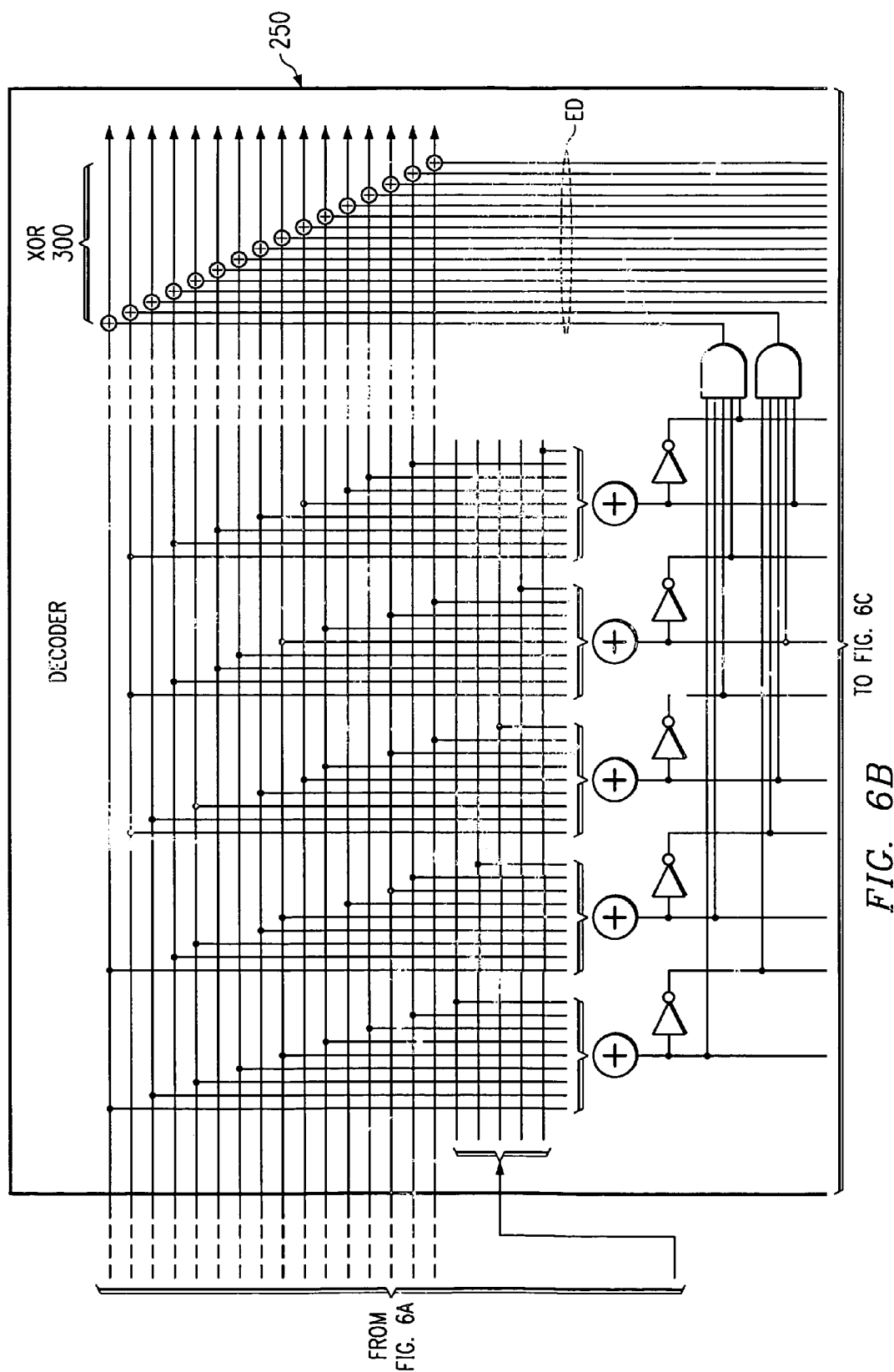
FIG. 6 is a circuit diagram illustrating the constitution of the ECC encoder and ECC decoder on the basis of the Hamming system.
Figure 6C:
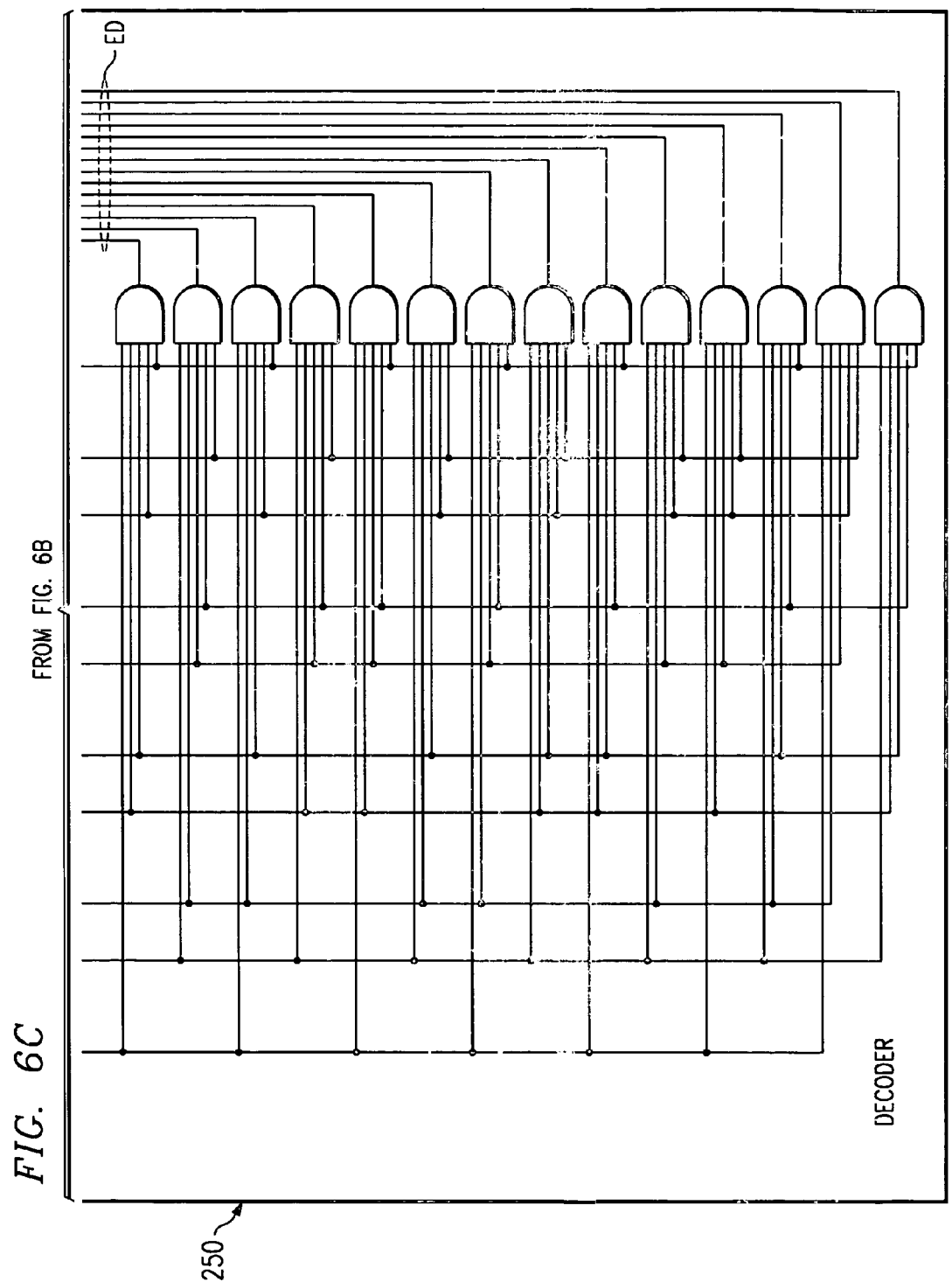

FIG. 6 is a circuit diagram illustrating the constitution of ECC encoder 260, ECC decoder 250 and error correction circuit 300 using the Hamming system. As shown in the figure, ECC encoder 260 generates a 5-bit error correction code EC ($E_1$, $E_2$, $E_3$, $E_4$, $E_5$) corresponding to the 16-bit stored data. The ECC code-generating matrix H is realized by selectively connecting each of the eight exclusive-OR inputs of the encoder to corresponding data bits $D_0$-$D_{15}$ ($X_1$-$X_{16}$). Each row of the matrix H has eight ones indicating connections and eight zeros indicating no connections. For example, the exclusive-OR gate that produces error correction code bit $E_1$, receives data input bits $D_{15}$, $D_{13}$, $D_{11}$, $D_9$, $D_7$, $D_5$, $D_3$, $D_1$ corresponding to the first row of matrix H(1 0 1 0 1 0 1 0 1 0 1 0 1 0 1 0). The 16-bit input data DAT is stored in main memory array 110, and 5-bit error correction code EC ($E_1$, $E_2$, $E_3$, $E_4$, $E_5$) is stored in sub-memory array 120.

In read mode, 16-bit output data DAT is read from main memory array 110, and it is output through sense amplifier 130. On the other hand, 5-bit error correction code EC ($E_1$, $E_2$, $E_3$, $E_4$, $E_5$) is read from sub-memory array 120. In ECC decoder 250, corresponding to read data DAT and error correction code EC, 16-bit error correction data ED is generated and sent to error correction circuit 300.

Referring now to the decoder 250 of FIG. 6, each row of the ECC code-generating matrix H is realized by selective connection of each of eight exclusive-OR gate inputs to eight corresponding data bits. These eight inputs or connections correspond to ones in each row of the matrix H as previously described. A ninth input of each exclusive-OR gate is coupled to receive a respective parity bit ($E_1$, $E_2$, $E_3$, $E_4$, $E_5$). The outputs of each exclusive-OR gate are inverted, thereby producing true and complementary outputs. These true and complementary outputs of each exclusive-OR gate are selectively connected to five respective inputs of each of sixteen AND gates corresponding to the 16-bit data word DAT. The selective connection to each AND gate input corresponds to each respective column of the matrix H. For example, from left to right true outputs of the first two exclusive-OR gates and complementary outputs from the last three exclusive-OR gates are applied as inputs to the top AND gate corresponding to data bit $D_{15}$. These connections correspond to the left most column of matrix H (1 1 0 0 0) corresponding to column $X_{16}$. Output signals of each of the sixteen AND gates form the error correction signal ED. These error correction signals are applied to sixteen respective exclusive-OR gates as previously described in FIG. 3. Each bit of error correction signal ED is the same as respective code signal COR. The complement of each bit of error correction signal ED is the same as complementary code signal XCOR.

In this embodiment, error correction circuit (300) is composed of bit correction circuit (300*a*), with the number of bit correction circuits 300*a* equal to the number of bits (e.g., 16) of read data DAT. In bit correction circuit 300*a* shown in FIG. 3, correction signal COR is the signal generated corresponding to a bit of error correction data ED. As explained above, when correction signal COR is at the low level, read data $D_{in}$ is input to node ND2, and, corresponding to it, program bus PBUS is driven. On the other hand, when correction signal COR is at the high level, the logical NOT data of read data $D_{in}$ is input to node ND2, and, corresponding to it, program bus PBUS is driven. That is, program bus PBUS is driven corresponding to exclusive-OR logical operation of correction signal COR and read data $D_{in}$. Exclusive-OR gates are used in error correction circuit 300 shown in FIG. 6.

Figure 7:
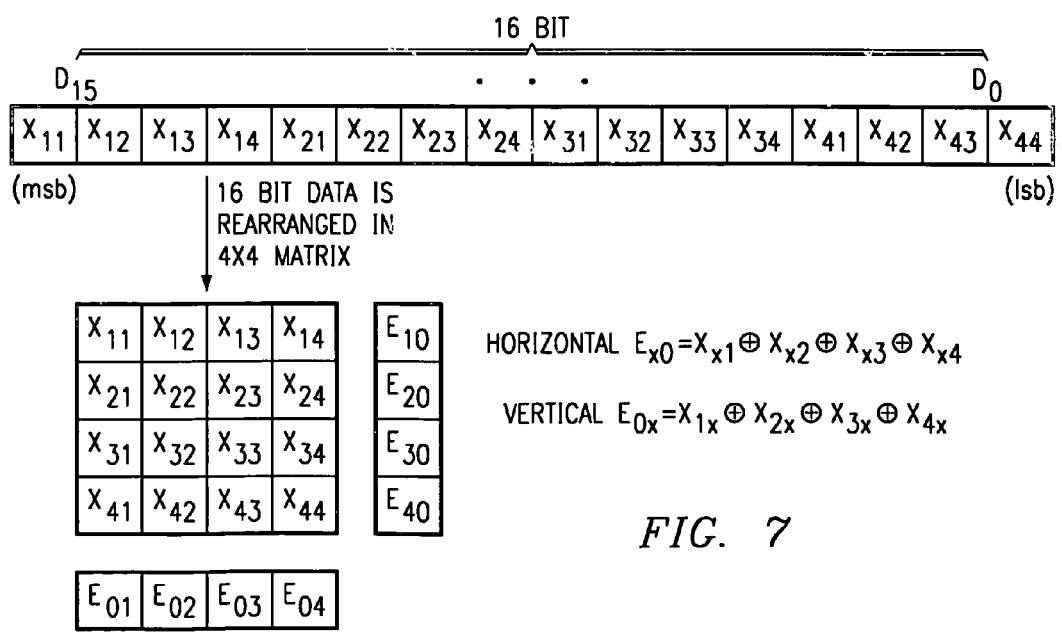
FIG. 7 is a schematic diagram illustrating the principle of the vertical-horizontal parity system.

Referring now to FIG. 7, there is a diagram illustrating the principle of error correction using the vertical-horizontal parity system. The vertical-horizontal parity system is an alternative embodiment of the present invention as will be explained in detail. It may be used in lieu of the 5-bit Hamming system by substituting ECC encoder 260 and ECC decoder 250 as will be appreciated by those of ordinary skill in the art having access to the instant specification. In the vertical-horizontal parity system, the 16-bit data word from the most significant bit (msb) to the least significant bit (lsb) is divided into 4 groups. These 4 groups of data are used to form a 4×4 matrix. Then, by means of the exclusive-OR logic operation, parity codes $E_{xo}$ and $E_{ox}$ are generated for each row and column of the matrix. Here, the subscript x refers to sequence numbers 1–4 as indicated.

Figure 8A:
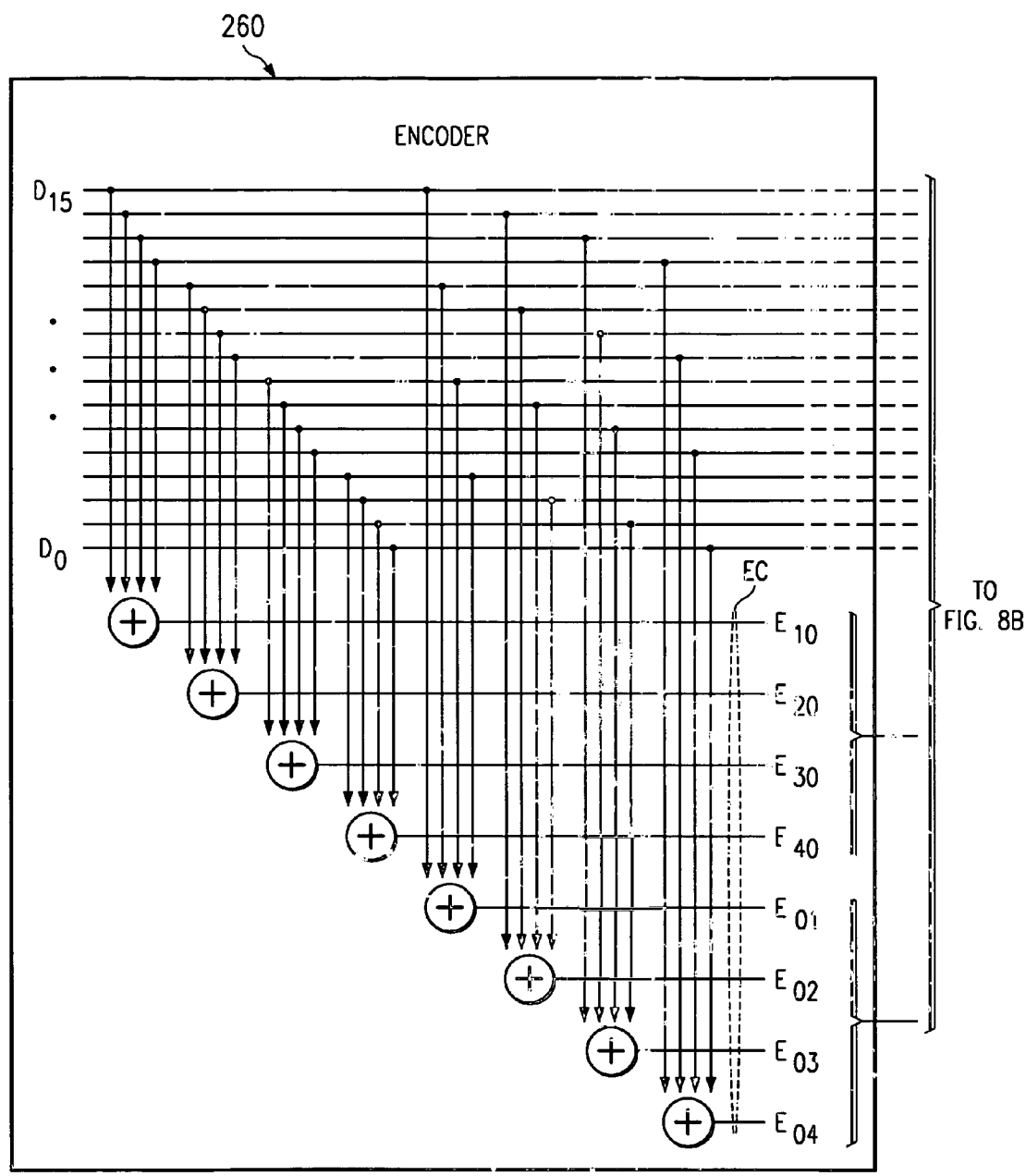
FIG. 8 is a circuit diagram illustrating the constitution of FCC encoder and ECC decoder on the basis of the vertical-horizontal parity system.
Figure 8B:
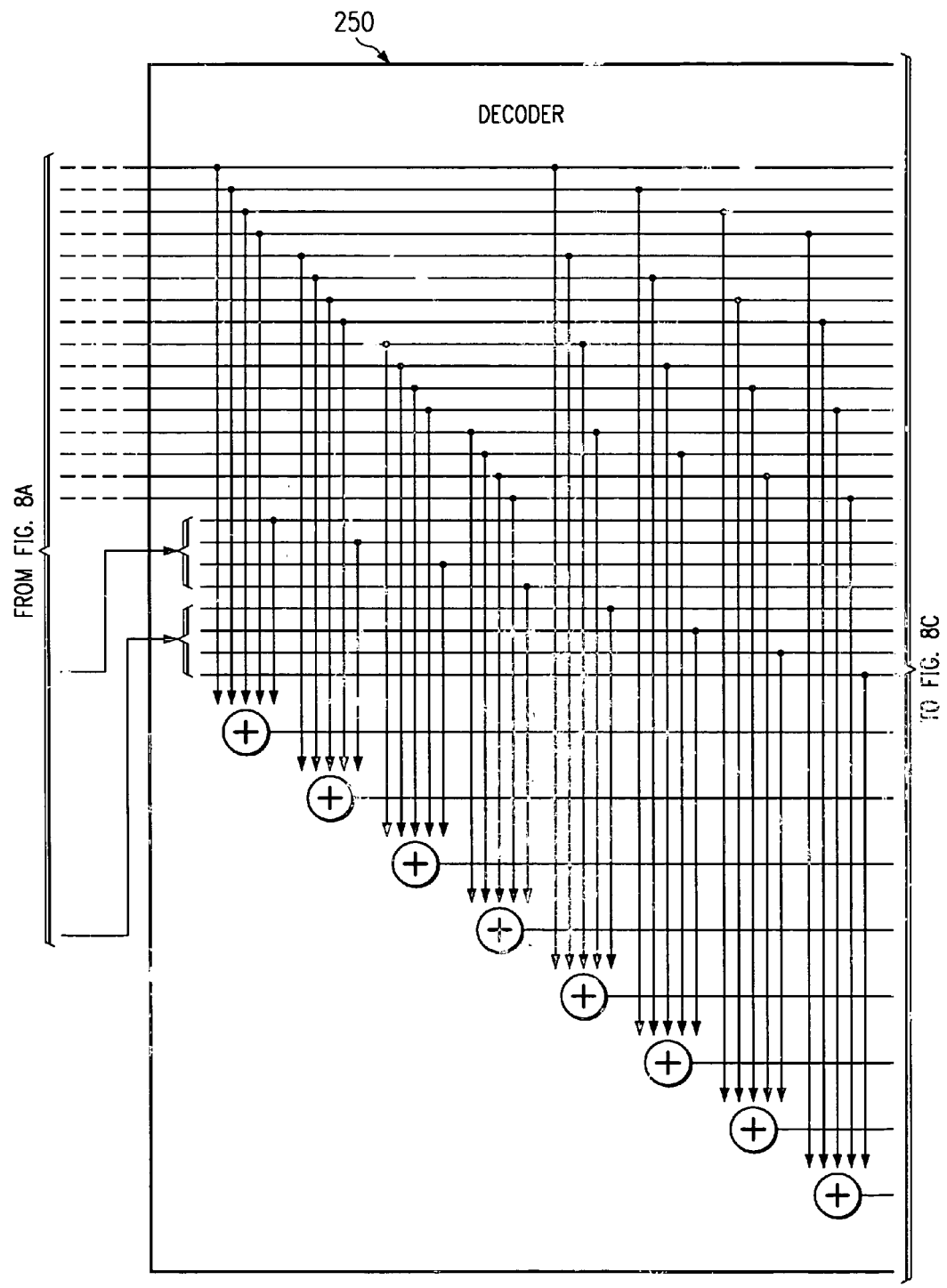
Figure 8C:
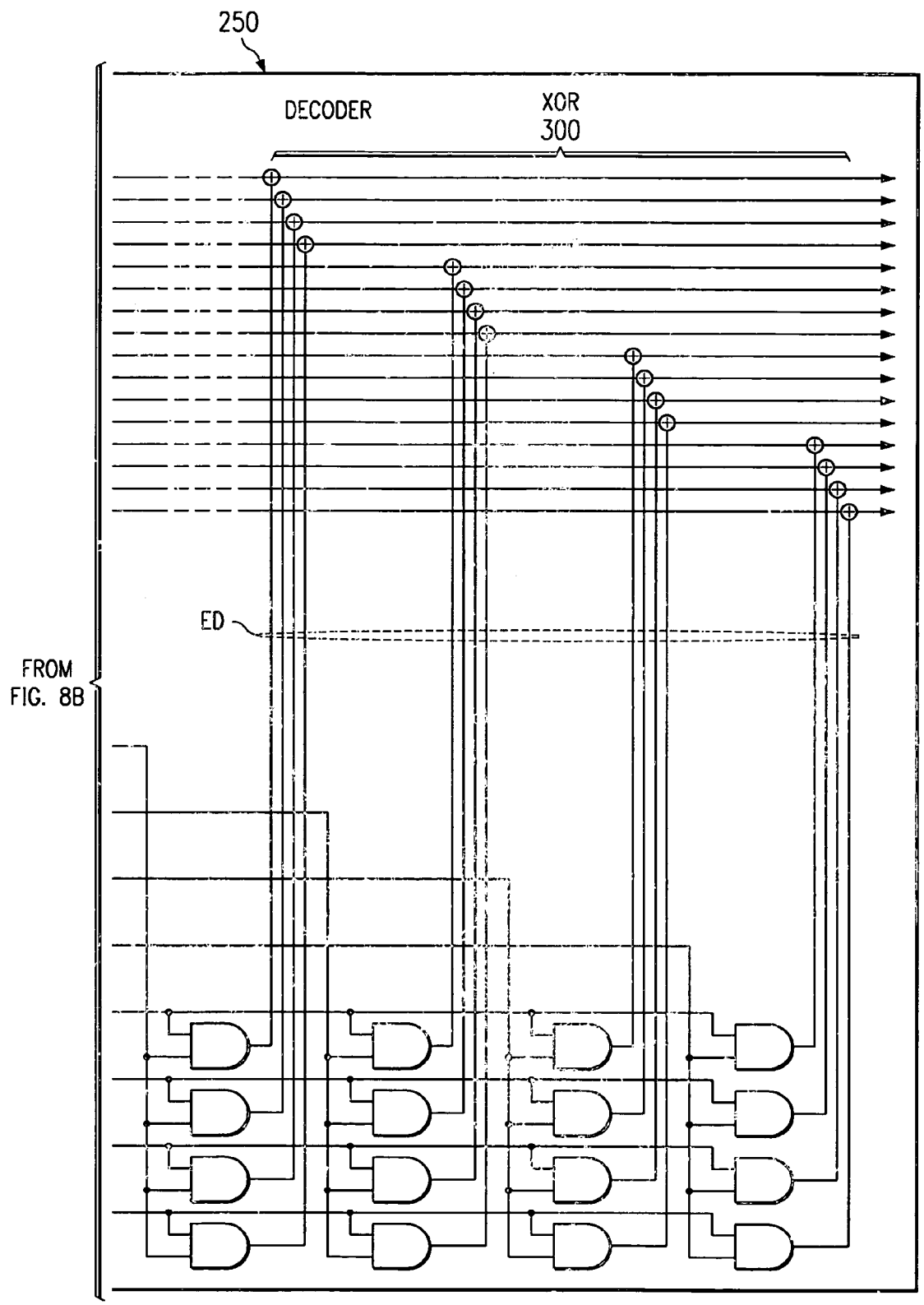

Referring to FIG. 8, the 8-bit vertical and horizontal parity codes are generated from a 16-bit data word by eight respective exclusive-OR gates of the ECC encoder. The eight parity codes or bits are stored as error correction code EC in sub-memory array 120. For example, exclusive-OR gates that produce error correction codes $E_{10}$–$E_{40}$ correspond to respective rows of the parity matrix of FIG. 7. Likewise, exclusive-OR gates that produce error correction codes $E_{01}$–$E_{04}$ correspond to respective columns of the parity matrix of FIG. 7. Input signals for each respective exclusive-OR gate are taken from corresponding data bits of each 16-bit data word as indicated at FIG. 7. The 16-bit data word is stored in main memory array 110.

The ECC decoder circuit of FIG. 8 illustrates the constitution of ECC decoder 250 and error correction circuit 300 using the vertical-horizontal parity system. As shown in the figure, ECC decoder 250 includes eight 5-input exclusive-OR gates. Four of the inputs are coupled to receive the same data bits as the ECC encoder. The fifth input receives the corresponding stored parity bit. Each exclusive-OR gate output is routed to four of sixteen respective AND gates. The output of each AND gate is error correction code ED. Each bit of error correction code ED is applied to respective exclusive-OR gates of error correction circuit 300 together with the read data word. Error correction circuit 300 performs an exclusive-OR of the error correction code ED and the 16-bit read data word. Any 1-bit data error will be corrected, and corrected data will be produced on the program bus PBUS as previously described.

In read mode when there is no error, a 16-bit data word is read from main memory array 110 and a corresponding 8-bit error correction code is read from sub-memory array 120. Each of eight exclusive-OR gates of error correction circuit decoder 250 generates the same parity codes as previously stored in sub-memory array 120. An exclusive-OR with the corresponding stored parity code at the fifth input of each exclusive-OR gate produces a low level output. The low level output from each exclusive-OR gate is applied to four of sixteen AND gates. Since all inputs are low, corresponding to no read errors, the AND gates each produce a low level output parity word ED. Error correction circuit 300 performs an exclusive-OR of this all-zero parity word with the 16-bit read data word. The read data word is unchanged, since an exclusive-OR with zero will not change the data.

In read mode when there is a 1-bit error in the 16-bit read data word, four inputs of each exclusive-OR gate of the FCC decoder 250 receive the same data bits as the ECC encoder 260 except for the error bit. The fifth input receives the corresponding stored parity bit. The resulting outputs from exclusive-OR gates corresponding to the intersecting row and column of the error bit will each be a high level, since different inputs to exclusive-OR gates produce high level outputs. One of the sixteen AND gates will receive a high row and column parity bit, thereby producing a high level output bit in error correction code ED. The intersection of the high level row and column parity bits indicates the location of the error bit in the read data word. All other bits of error correction code ED will be low level, since at least one input of each of the other fifteen AND gates is low. The high level bit in the ED code word is applied to error correction circuit 300. The corresponding error bit of the read data word is inverted or corrected, since an exclusive-OR of one with the error data bit changes its logical state. The corrected read data word is then applied to the output data bus. Consequently, program bus PBUS is driven by the corrected data.

As explained above, in this embodiment, the error correction code generated corresponding to the stored data is stored in a sub-memory array arranged separately from the main memory array that stores the stored data. In read mode, the stored data and error correction code are read from main memory array and sub-memory array, respectively. On the basis of these data, error correction is performed for the read data to generate error correction data. By means of the error correction circuit, error of the read data is corrected on the basis of the error correction data. The error correction code is stored in a sub-memory different from the main memory array. By selecting the appropriate layout of the main memory and sub-memory arrays, the read operation of the error correction code can be performed at higher speed. As a result, it is possible to suppress the delay time generated during the error correction treatment, and it is possible to perform error correction at higher speed.

As explained above, in the semiconductor memory device of the present invention, by selecting the appropriate main memory that stores the stored data and the sub-memory that stores the error correction code, it is possible to read the error correction code at high speed, to absorb time delays due to decoding treatment for error correction, and to perform error correction processing at high speed.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For example, other error correction codes are equally compatible with the present invention. Furthermore, the error correction circuit may be readily disabled to facilitate main memory testing by holding correction code ED low during test mode. Testing of sub-memory data may be accomplished by multiplexing correction code EC with data bus DAT in test mode. Further, it will be appreciated that the relative logic levels (low or high) chosen in the embodiments may be reversed with corresponding changes to the logic circuitry and still preserve the functions described. It is therefore intended that the appended claims encompass any such modifications or embodiments.

The invention claimed is:

1. A semiconductor device comprising:
a main memory having bit lines and arranged to store main data;
a sub-memory having bit lines and arranged to store error correction sub-data corresponding to the main data;
a sense amplifier coupled to receive the main data stored in the main memory;
a decoder circuit coupled to receive the main data via said sense amplifier and the error correction sub-data from said sub-memory exclusive of said sense amplifier, the decoder circuit generating correction data for correcting errors in the main data in response to the main data and the error correction sub-data; and
a data correction circuit coupled to receive the main data and the correction data, the data correction circuit correcting the errors in the main data corresponding to the correction data.

2. A semiconductor device as in claim 1, wherein the sub-memory is arranged between the main memory and the decoder circuit.

3. A semiconductor device as in claim 1, wherein the sub-memory is arranged between the main memory and the data correction circuit.

4. A semiconductor device as in claim 1, wherein the bit lines of the main memory and the bit lines of the sub-memory comprise ifi different wiring layers.

5. A semiconductor device as in claim 1, wherein the main data is arranged in words, and the data correction circuit comprises a plurality of exclusive-OR gates corresponding to the number of bits in a main data word.

6. A semiconductor device as in claim 1, wherein the main data is arranged in words, and the data correction circuit comprises a plural bit correction circuits corresponding to the number of bits in a main data word, each the bit correction circuit comprising:
a first terminal;
a second terminal;
an output terminal;
a power supply terminal;
a reference terminal;
a first transistor having a current path connected between the power supply terminal and the output terminal and having a control terminal connected to the first terminal;
a second transistor having a current path connected between the reference terminal and the output terminal and having a control terminal connected to the second terminal;
a transfer gate having a current path connected between the first terminal and the second terminal and having a control terminal coupled to receive an enable signal; and
a drive circuit coupled to receive a bit of main data and a bit of correction data, the drive circuit arranged to produce one of the bit of main data and a complement of the bit of main data at the first terminal and the second terminal in response to a bit of the correction data.

7. A semiconductor device as in claim 1, wherein the correction data is a vertical-horizontal parity code corresponding to the main data.

8. A semiconductor device as in claim 7, wherein the vertical-horizontal parity code comprises an 8-bit code word corresponding to a 16-bit main data word.

9. A semiconductor device as in claim 1, wherein the correction data is a Hamming code corresponding to the main data.

10. A semiconductor device as in claim 9, wherein the Hamming code comprises a 5-bit code word corresponding to a 16-bit main data word.

11. A semiconductor device as in claim 1, wherein the decoder circuit is coupled to the main memory by a sense amplifier, and wherein the decoder circuit is not coupled to the sub-memory by a sense amplifier.

12. A semiconductor device as in claim 1, formed on a single integrated circuit with a digital signal processor.

* * * * *